(12) United States Patent
Hamilton

(10) Patent No.: US 7,282,671 B1
(45) Date of Patent: Oct. 16, 2007

(54) SPATULA DEVICE WITH INTEGRALLY OPERABLE COOLING CHAMBER

(75) Inventor: Thomas P. Hamilton, Cranston, RI (US)

(73) Assignee: Hasbro, Inc., Pawtucket, RI (US)

( * ) Notice: Subject to any disclaimer, the term of this patent is extended or adjusted under 35 U.S.C. 154(b) by 0 days.

(21) Appl. No.: 11/400,954

(22) Filed: Apr. 10, 2006

(51) Int. Cl.
*F24C 7/10* (2006.01)

(52) U.S. Cl. ............... 219/386; 294/1.1; 294/26.5; 446/481

(58) Field of Classification Search ............... 294/7, 294/8, 26.5, 1.1; 219/386; 446/219, 481
See application file for complete search history.

(56) References Cited

U.S. PATENT DOCUMENTS

| | | | | |
|---|---|---|---|---|
| 1,130,234 | A | * | 3/1915 | Wrobel .................. 99/422 |
| 2,567,091 | A | * | 9/1951 | Whitnah et al. .............. 294/7 |
| 4,095,832 | A | * | 6/1978 | Slinker ................. 294/8 |
| 4,249,067 | A | | 2/1981 | Cummings |
| 4,563,573 | A | | 1/1986 | Hartelius et al. |
| 4,772,243 | A | | 9/1988 | Zeiss |
| 5,443,293 | A | * | 8/1995 | Foreman ................ 294/7 |
| 5,451,745 | A | | 9/1995 | Goldberg et al. |
| 5,528,014 | A | | 6/1996 | Goldberg et al. |
| 6,865,815 | B1 | | 3/2005 | Dunn et al. |

OTHER PUBLICATIONS

Easy-Bake (R) Real Meal Oven, Hasbro Copyright 2003.
Queasy Bake (R) Cookerator, Hasbro Copryright 2002.
Easy-Bake (R) Oven Cookbook, Kenner Copyright 1991.

* cited by examiner

*Primary Examiner*—Dean J Kramer
(74) *Attorney, Agent, or Firm*—Perry Hoffman

(57) ABSTRACT

A spatula device operable for handling heated foodstuffs and manipulate a baking pan or container providing a unique and convenient integrally operable cooling chamber for receiving, cooling, and removing the baking pan or container from a complementary toy oven. The spatula device automatically retains the baking pan or container in the cooling chamber when the baking pan or container is removed from the toy oven used in combination and is operable to manually release the baking pan or container from the cooling chamber when the device is manipulated by a user. The spatula device includes a handle and a cooling chamber coupled to a first end with the chamber having an access opening defined in a wall, and the chamber manufactured from a thermochromic material capable of changing color corresponding to the temperature of the chamber.

20 Claims, 7 Drawing Sheets

SPATULA DEVICE WITH INTEGRALLY OPERABLE COOLING CHAMBER

BACKGROUND OF THE INVENTION

1. Field of the Invention

The present invention relates to a toy oven and a spatula device combination having an integrally operable cooling chamber. More particularly, the invention relates to the spatula device operable for handling heated foodstuffs in which the cooling chamber is provided with an access opening, and further coupled to a handle connected to the chamber for a received container or baking pan removed from the toy oven.

2. Description of the Related Art

Known toy ovens have a housing with a heated baking chamber contained therein which include an access opening to the baking chamber. Some of the toy ovens have a separate "entrance" and "exit" opening to the heated chamber while other toy ovens utilize only one access opening as both the "entrance" and "exit". Additionally, various types of spatula-like members exist for depositing and retrieving a baking container into and out of a toy oven. The known spatula-like members include a handle coupled to a flat spatula element which may be broad or narrow depending upon the size and shape of the access opening of the toy oven in which they are used in combination.

The known spatula-like elements, whether broad or narrow, are usually rigid and manufactured from a plastic or metal material. Some spatula elements include side walls and a back wall which extend up from the spatula element and are designed to complement the shape of the access opening in order to block entry of unwanted foreign objects into the opening of the heated chamber. Some of the spatula-like members also include a pusher end coupled to the handle at an end opposite the spatula element. None of the spatula-like members however are known to include a chamber coupled to the handle, sized to cooperate with the access opening of the heated chamber and operable as a cooling chamber for a received baking container.

SUMMARY OF THE INVENTION

In one embodiment of the invention a spatula device to manipulate a container is integrally operable as a cooling chamber and includes a handle having a first end and a second end with a cooling chamber coupled to the first end of the handle. The cooling chamber includes an access opening defined in a wall of the chamber and is operable for receiving, handling, and cooling heated foodstuffs contained in a baking pan or container and removed from a complementary toy oven with the spatula device of the present invention.

In another embodiment of the present invention, the spatula device includes a latch assembly pivotally attached to the cooling chamber and operative to automatically retain a received baking pan or container in the cooling chamber and manually release the baking pan or container from the cooling chamber when manipulated by a user.

In one embodiment of the invention, the cooling chamber is manufactured from a thermochromic material capable of changing color corresponding to the temperature of the chamber. In yet another embodiment of the invention, the cooling chamber is manufactured from a temperature resistant plastic material.

In one embodiment of the invention, a toy oven and a spatula device for manipulating a container used in combination with the toy oven includes a toy oven having a housing containing a heating chamber with an attached feed shoot defining an access opening to the heating chamber and a spatula device including a handle having a cooling chamber coupled to an end, including an access opening defined in a wall of the chamber and operating as a cooling chamber for a received container. In yet another embodiment, a latch assembly including a barrier is coupled to the cooling chamber and at least one humped shoulder is coupled to a wall of the feed shoot for engagement with at least one protrusion coupled to a barrier of the latch assembly to automatically lift the barrier to block the access opening of the cooling chamber retaining a received container when the cooling chamber end of the spatula device is removed from the feed shoot of the toy oven used in combination.

Additional objects and advantages of the invention will be set forth below with reference to the drawings and the detailed description. It is to be understood that the invention is not limited in its application to the details of the examples provided in the description or illustrated in the drawings. The invention is capable of other embodiments and of being practiced or carried out for a variety of applications and in various ways.

BRIEF DESCRIPTION OF THE DRAWINGS

The invention will now be more particularly described, by way of example, with reference to the accompanying drawings, novel features believed characteristic of the invention are set forth in the appended claims. The invention itself as well as the preferred mode of use, further objectives and advantages thereof, is best understood by reference to the following detailed description of the embodiments in conjunction with the accompanying drawings, in which:

DETAILED DESCRIPTION OF THE PREFERRED EMBODIMENTS

Figure 1:
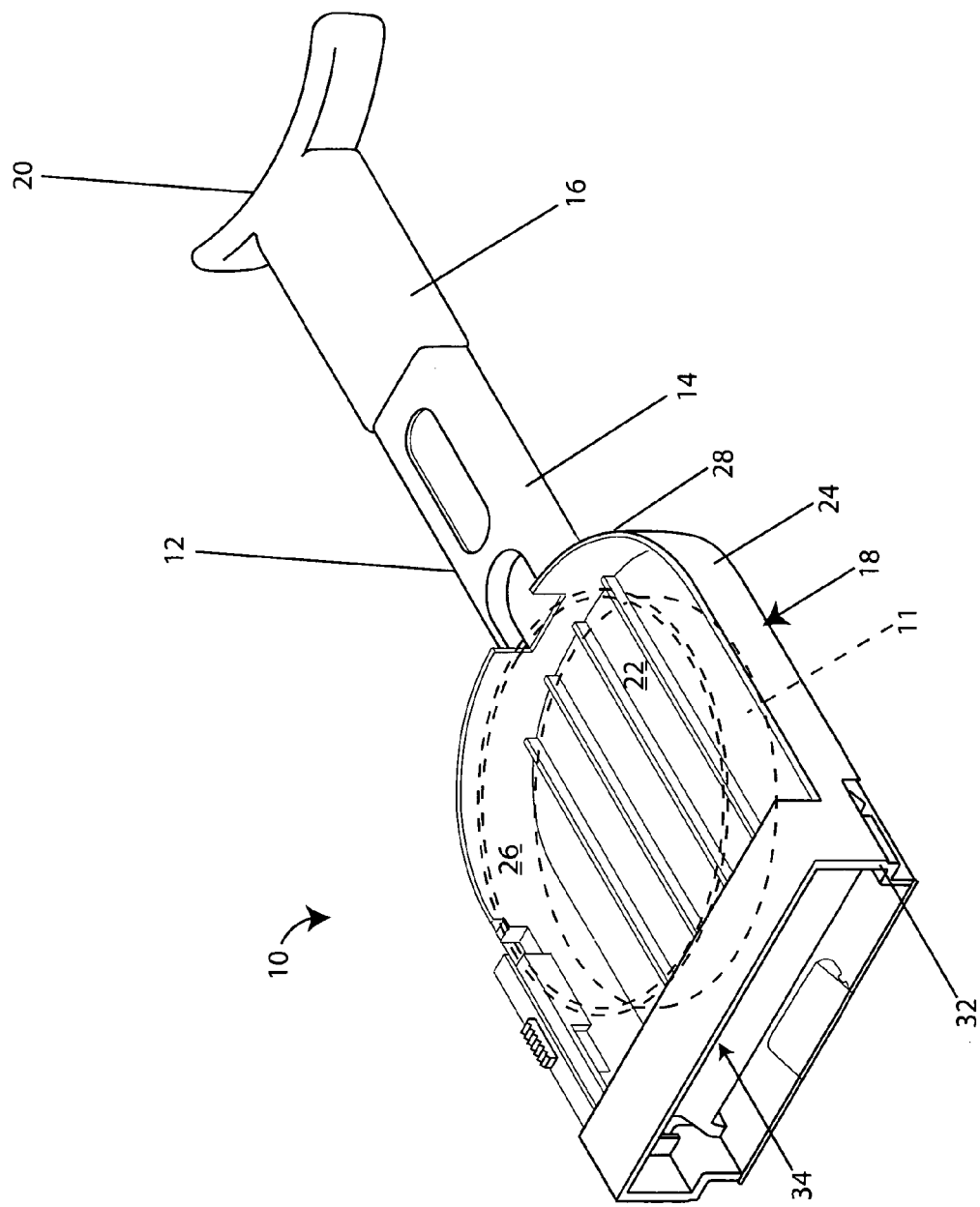
FIG. 1 is a perspective view of the spatula device of the present invention.

A spatula device, generally shown in FIG. 1 as reference numeral 10, is operable to manipulate a baking pan or container, generally shown in dash lines, as reference numeral 11, providing a unique and convenient cooling chamber for receiving, cooling, and removing the baking pan or container from a complementary toy oven. The spatula device 10 automatically retains the baking pan or container in the cooling chamber when the pan is removed from the toy oven used in combination and is operable to manually release the baking pan or container from the cooling chamber when the device is manipulated by a user. The spatula device of the present invention can be any variety of sizes including large, medium, or small, depending upon the size of the container to be contained therein and the size of the access opening of the complementary toy oven. Likewise, the baking pan or container can be a variety of sizes and shapes as long as the pan is sized to fit into both the cooling chamber of the spatula device and the heating chamber of the complementary toy oven.

The spatula device 10, as shown in FIG. 1, includes a handle 12 having a first end 14 and a second end 16. A cooling chamber 18 is attached or integral with the first end 14 and a pusher end 20 is attached or integral with a second end 16. The handle 12 can be a variety of lengths and should be long enough to allow a user to safely push the baking pan or container 11 into a heating chamber of a toy oven with the pusher end 20 and also retrieve the baking pan or container with the chamber 18 of the device, while safely keeping her/his hand(s) from touching the hot heating chamber. The handle 12 can also be a variety of shapes and thicknesses and should be rigid and strong enough to support the cooling chamber 18 and contained baking pan 11 suspended from the handle 12, as seen in FIG. 1.

Figure 2:
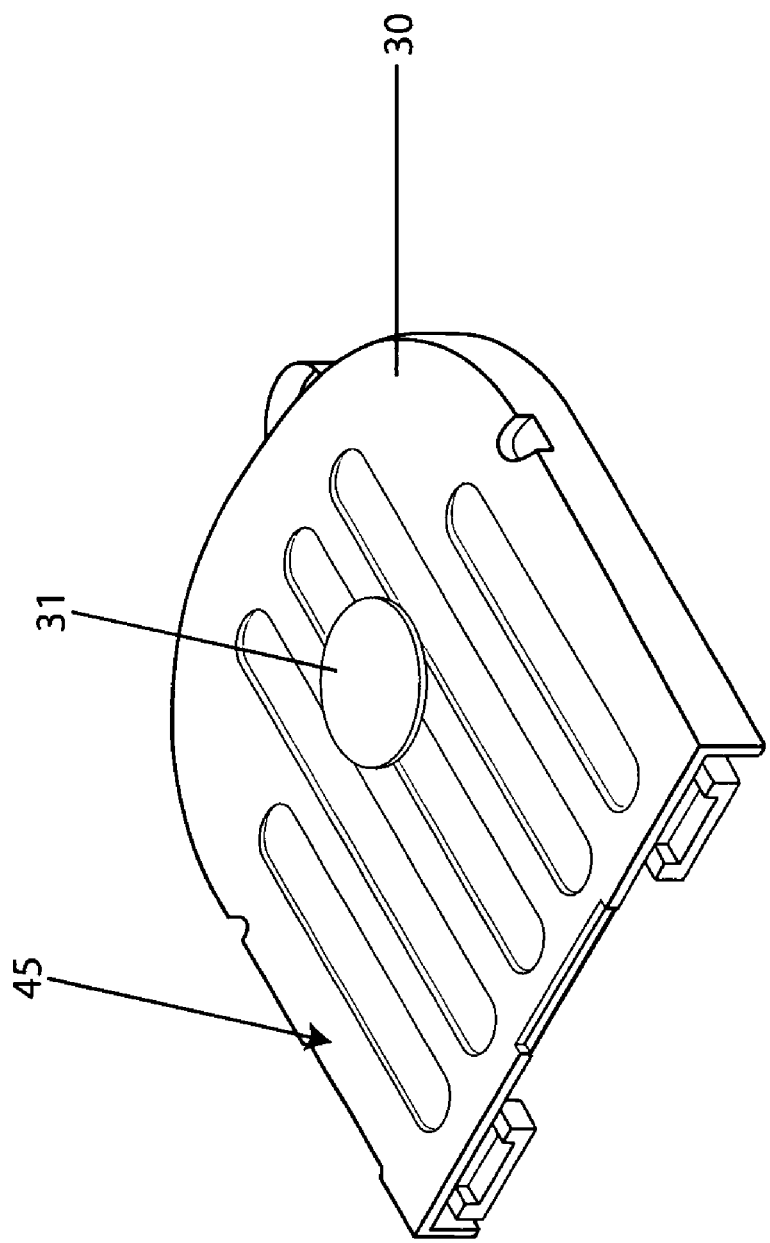
FIG. 2 is a perspective view of the top wall of the chamber of the spatula device.
Figure 3:
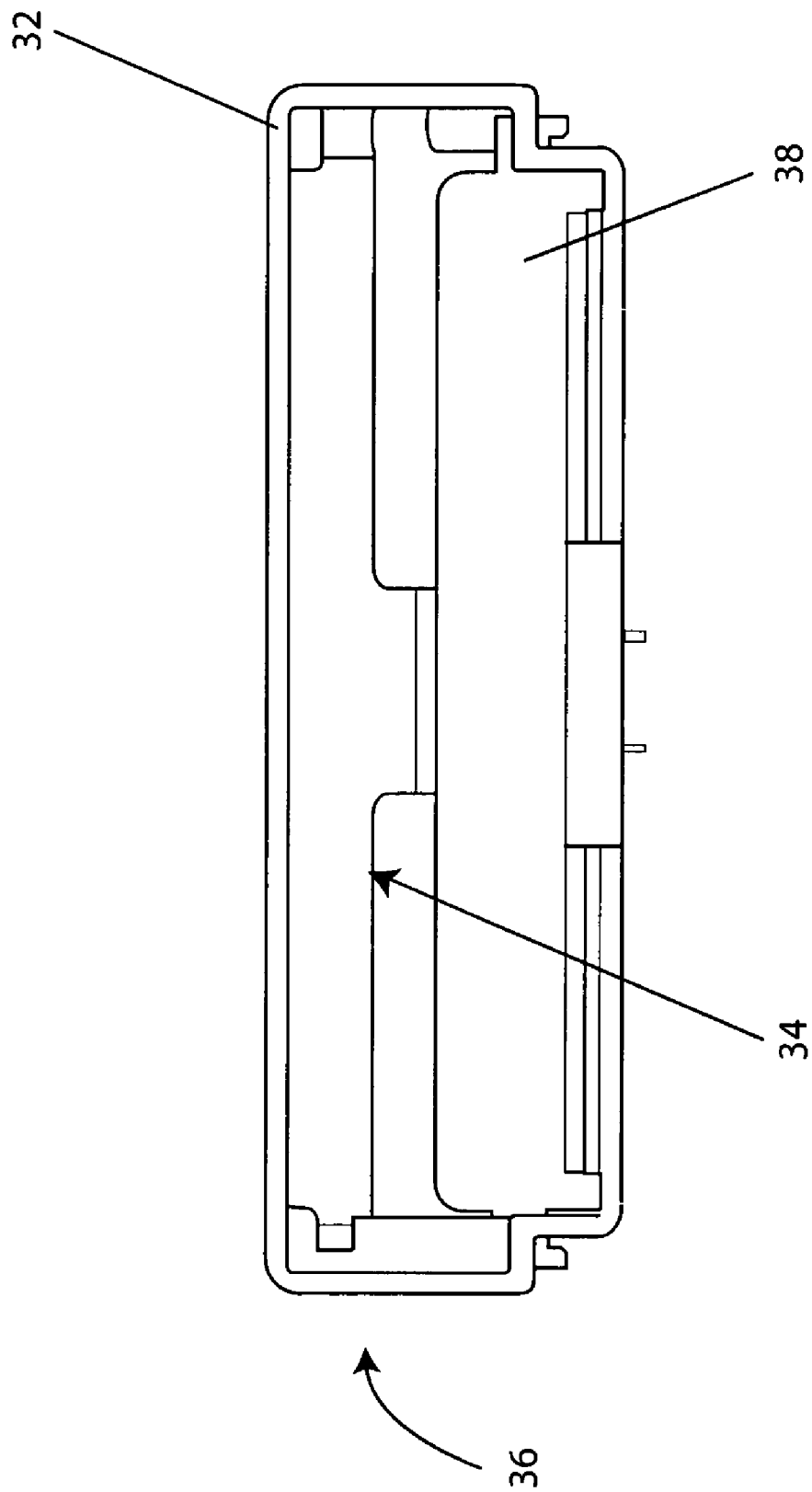
FIG. 3 is a front view of the spatula device illustrating an elongated barrier in an access opening.

As seen in FIGS. 1 and 2, the cooling chamber 18 includes a bottom wall 22, first and second side walls 24 and 26 respectively, a curved back wall 28, and a top wall 30. As seen in FIG. 3, the cooling chamber 18 also includes a front wall 32 with an access opening 34 defined by front wall 32. The cooling chamber 18 is shaped and sized such that the baking pan or container 11 can be contained therein. The cooling chamber 18 is also shaped and sized according to the access opening of the heating chamber of the complementary toy oven which cooperates with the chamber 18 of the spatula device 10. Cooling chamber walls 22-32 may be attached to one another or integral with each other, or any combination thereof, and curved back wall 28 is integral with handle 12, as seen in FIG. 1.

All or some of the cooling chamber walls 22-32 may be manufactured from a thermochromic material, generally shown as reference numeral 31 in FIG. 2, capable of changing color as the temperature of the chamber changes, thus enabling a user to quickly and easily determine when a hot baking pan or container contained therein has cooled. Alternatively, the entire spatula device 10 may be manufactured from a thermochromic material thus alerting a user to the temperature of any part of the handle 12, pusher end 20, or cooling chamber 18 so a user will not touch any part of the spatula device 10 unless it is at a cool temperature. Also, the spatula device 10, or select walls of the cooling chamber 18 may be alternatively manufactured from a temperature resistant plastic material and a color changing temperature guide may be applied to a wall of the cooling chamber 18, if desired. As seen in FIG. 2, top wall 30 can also be transparent so as to enable a user to see into the cooling chamber 18.

Figure 4:
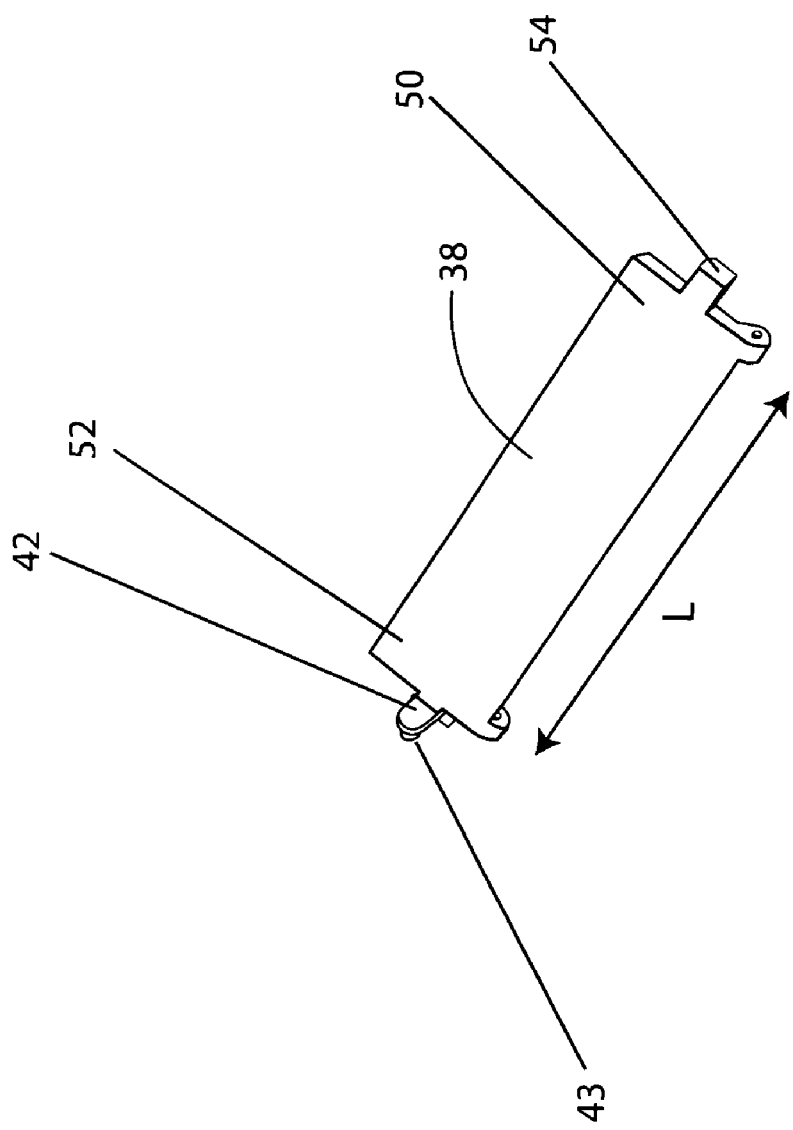
FIG. 4 illustrates the elongated barrier of a latch assembly.
Figure 5:
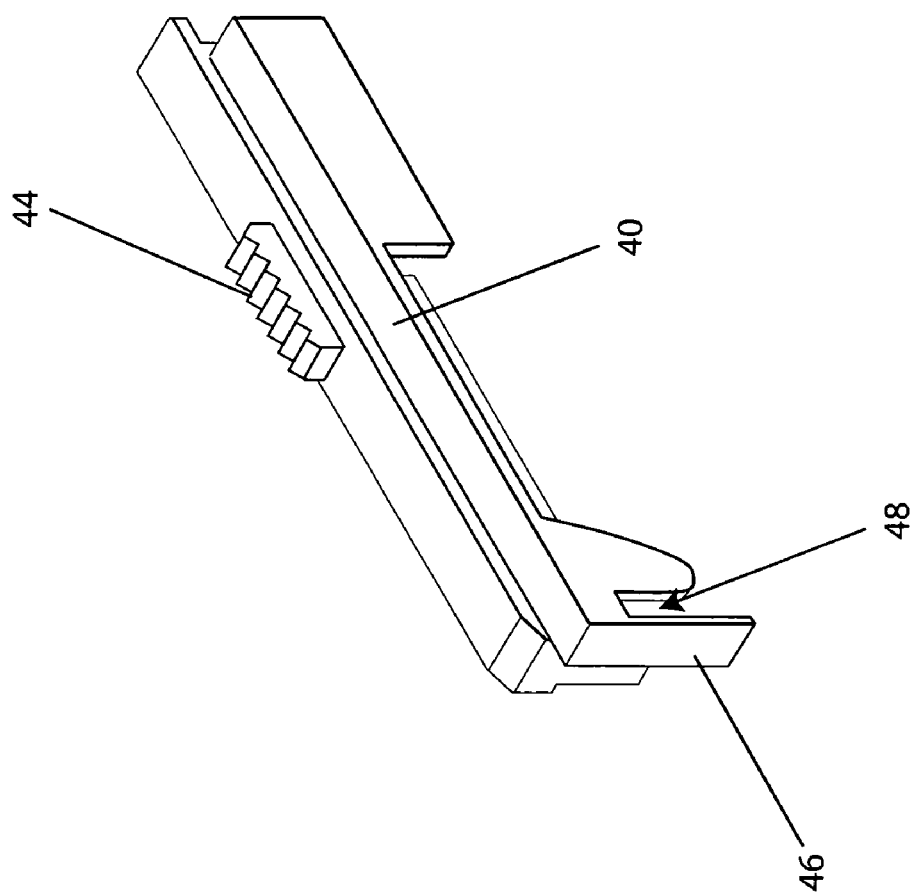
FIG. 5 illustrates the actuating bar of the latch assembly.

The spatula device 10 further includes a latch assembly 36 coupled to the chamber 18 and including an elongated barrier 38 and actuating bar 40 as seen in FIGS. 3-5. The latch assembly 36 is operative to automatically retain the baking pan or container 11 in the chamber 18 when received and also manually release the baking pan or container from the chamber 18 when the actuating bar 40 is manipulated by a user. The elongated barrier 38 is pivotally attached to the bottom wall 22 and, as seen in FIG. 3, is sized to span the access opening 34 of the chamber 18. The barrier 38 also includes an arm 42 and a pin 43 operative to link to the actuating bar 40, as seen in FIG. 4.

As seen in FIGS. 1 and 2, the actuating bar 40 is coupled to the top wall 30 of the chamber 18 and includes a finger grip portion 44 protruding from a slot 45 cut into the top wall 30 for easy manipulation of the actuating bar by a user. The actuating bar 40 further includes a descending projection 46 including a U-shaped groove 48 cut into the projection, as seen in FIG. 5. The actuating bar 40 is operative to slide parallel with the first and second side walls, as seen in FIG. 1, and when pin 43 is linked to projection 46 of bar 40, pin 43 slides perpendicular to bar 40 along groove 48, resulting in the raising and lowering of barrier 38. As the actuating bar 40 slides in a direction away from the back wall 28 of the chamber, the arm 42 through pin linkage 43 lifts the barrier 38 upright off the bottom wall 22 blocking the access opening 34 and stopping a contained baking pan or container from sliding out of the cooling chamber 18. As the actuating bar 40 slides in a direction toward the back wall 28 of the chamber, the arm 42 through pin linkage 43 lays the barrier 38 down against the bottom wall 22 opening up the chamber and allowing a contained baking pan or container to be removed from the cooling chamber 18.

The barrier 38 has a length L, as seen in FIG. 4, and includes a first end 50 and a second end 52. A protrusion is coupled to at least one of the first or second ends of the barrier 38, and as seen in FIG. 4, protrusion 54 is coupled to first end 50. Protrusion 54 engages at least one humped shoulder, external to the spatula device and coupled to the complementary toy oven as discussed further below, to automatically lift the barrier 38 upright blocking the access opening 34 after the container 11 is received in the cooling chamber 18.

Figure 6:
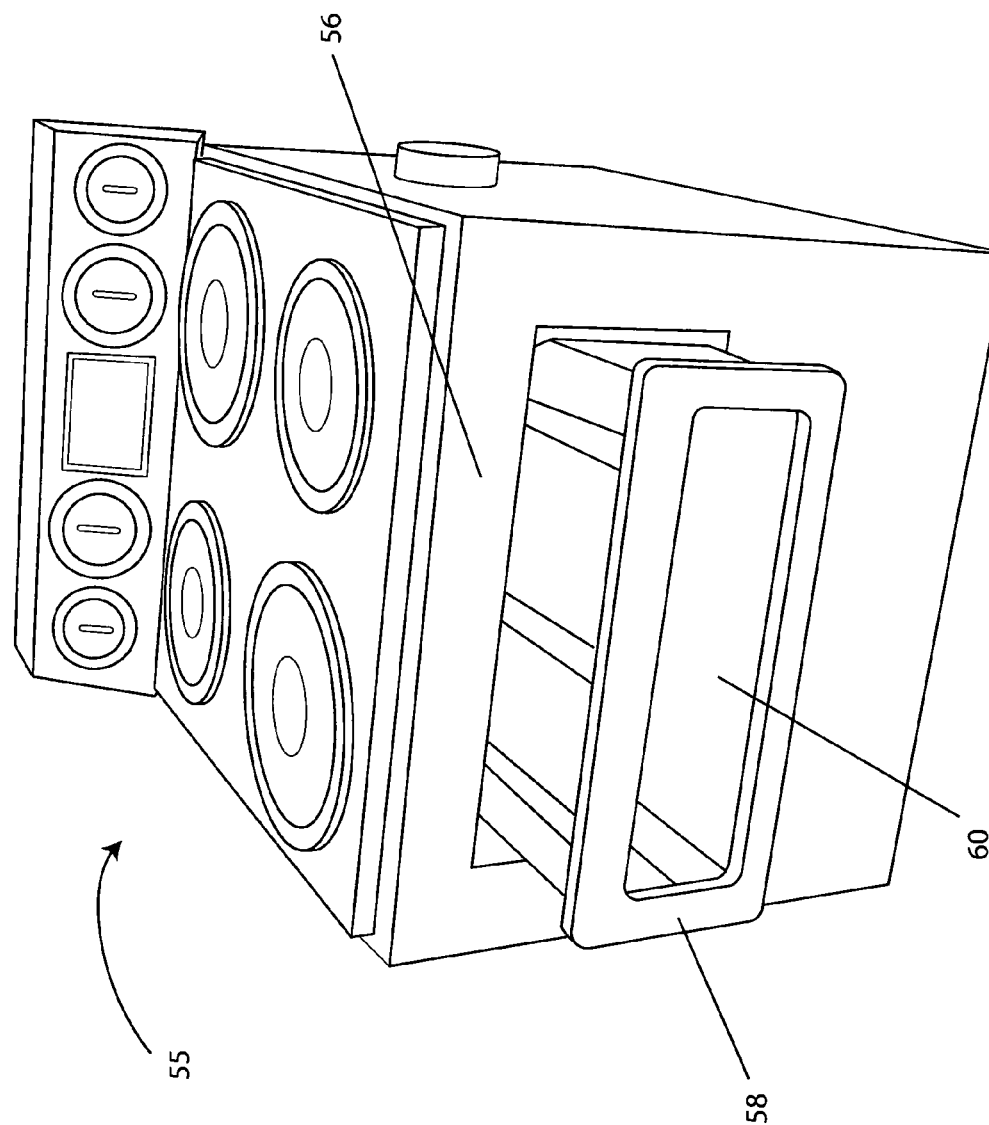
FIG. 6 is a perspective view of a toy oven used in combination with the spatula device of the present invention.
Figure 7:
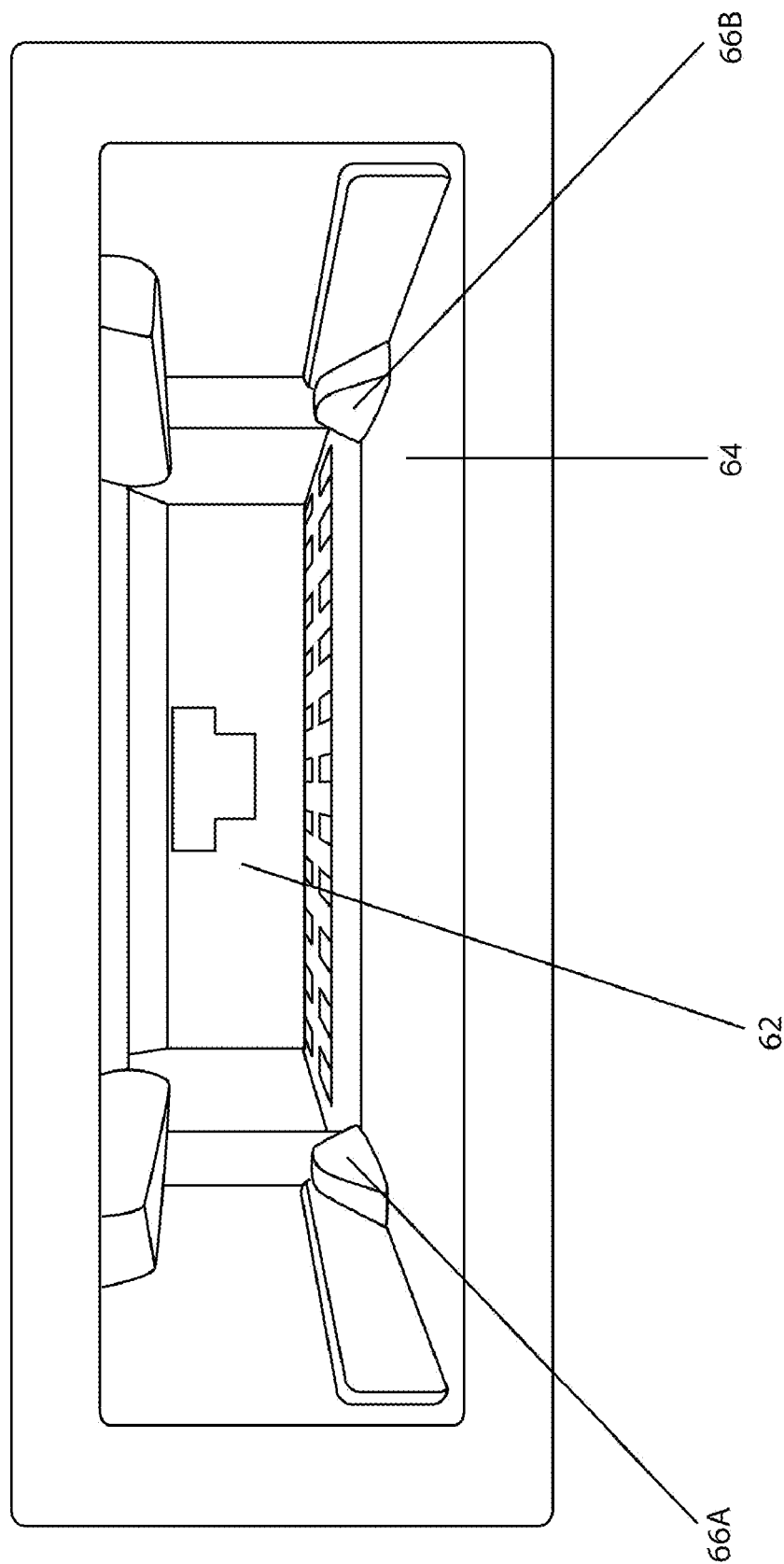
FIG. 7 illustrates humped shoulders of a feed shoot leading to a heating chamber of the toy oven of the present invention.

The toy oven 55 used in combination with the spatula device 10 as seen in FIGS. 6 and 7, includes a housing 56 and a single feed shoot 58 which is generally rectangular in shape and protrudes out from the housing 56 of the toy oven 55. The feed shoot 58 defines a single access opening 60 used as the "entrance" and "exit" from a heating chamber 62, containing a heating element, of the toy oven 55. The Feed shoot 58 and defined access opening 60 are shaped and sized to allow the spatula device 10 to access the heating chamber 62 of the toy oven 55. A bottom wall 64 of the feed shoot 58 further includes at least one humped shoulder attached or integral with the wall 64, and as seen in FIG. 7, humped shoulders 66A and 66B are attached to bottom wall 64.

In use, the baking pan or container 11 is loaded with a foodstuff to be heated and the pan 11 is placed on the feed shoot 58 for entry into the toy oven 55. With the pusher end 20 of the spatula device 10 the pan 11 is slid into the heating chamber 62 of the toy oven 55. When heated to a desired temperature, the cooling chamber end 14 of the spatula device 10 is slid through the access opening 60 of the feed shoot 58 into the heating chamber 62 capturing the baking pan 11 in the cooling chamber 18. As the spatula device is pulled from the heating chamber, at least one of the humped shoulders 66A and 66B engages at least one of protrusion 54 coupled to barrier 38 and/or a protrusion coupled to second end 52 of barrier 38, to automatically lift barrier 38 upright blocking the cooling chamber's access opening and trapping the captured container. When the baking pan 11 and cooling chamber 18 have cooled to a temperature that is safe to touch as indicated by the color of the thermochromatic plastic of the cooling chamber, or any other alternative temperature indicator used, the user will manually release the baking pan 11 from the cooling chamber 18 by sliding the actuating bar 40, with the use of the finger grip portion 44, in a direction away from the back wall 28 of the cooling chamber 18.

As further described, a toy oven and a spatula device combination having an integrally operable cooling chamber includes a toy oven 55 having a housing 56 containing a heating chamber 62 with an attached feed shoot 58 defining an access opening 60 to the heating chamber and a spatula device 10 including a handle 12 having a cooling chamber 18 coupled to an end, including an access opening 34 defined in a wall 32 of the chamber and operating as a cooling chamber 18 for a received container. A latch assembly 36 including a barrier 38 is coupled to the cooling chamber 18 and at least one humped shoulder 66 is coupled to a wall 64 of the feed shoot 58 for engagement with at least one protrusion 54 coupled to the barrier 38 of the latch assembly 36 to automatically lift the barrier 38 to block the access opening 34 of the cooling chamber 18 retaining a received container 11 when the cooling chamber end of the spatula device 10 is removed from the feed shoot 58 of the toy oven 55 used in combination.

It should be appreciated that a wide range of changes and modifications may be made to the embodiments of the inventions as described herein. It is intended that the foregoing detailed description be regarded as illustrative rather than limiting. While there have been illustrated and described particular embodiments of the inventions, it will be appreciated that numerous changes and modifications will occur to those skilled in the art, and it is intended in the appended claims to cover those changes and modifications which fall within the true spirit and scope of the present invention.

What is claimed is:

1. A toy oven and a spatula device for manipulating a container used in combination with the toy oven, comprising:
   a toy oven having a housing containing a heating chamber with an attached feed chute defining an access opening to the heating chamber; and
   a spatula device including a handle having a chamber coupled to a first end, including an access opening defined in a wall of the chamber and operating as a cooling chamber for a received container, further including a latch assembly coupled to the cooling chamber including a barrier and an actuating bar operative to automatically retain the container in the cooling chamber when received and also manually release the container from the cooling chamber when the actuating bar is manipulated by a user.

2. The combination as recited in claim 1, further including at least one humped shoulder coupled to a wall of the feed chute for engagement with at least one protrusion coupled to the barrier of the latch assembly to automatically move the barrier to block the access opening of the cooling chamber retaining a received container when the cooling chamber end of the spatula device is removed from the feed chute of the toy oven.

3. The combination as recited in claim 1, wherein the cooling chamber comprises a temperature resistant plastic material.

4. The combination as recited in claim 1, wherein the cooling chamber comprises a thermochromic material capable of changing color corresponding to the temperature of the cooling chamber.

5. The combination as recited in claim 1, comprising a curved pusher end coupled at an end of said handle.

6. The combination as recited in claim 1, wherein the cooling chamber includes a top wall, a bottom wall, and first and second side walls with the actuating bar coupled at the top wall of the cooling chamber.

7. The combination as recited in claim 6, wherein the barrier of the latch assembly is pivotally attached to the bottom wall of the cooling chamber and spans the access opening with the barrier operative for lifting upright off the bottom wall blocking the access opening.

8. The combination as recited in claim 7, wherein the length of the barrier includes a first end and a second end with a protrusion coupled to at least one end of the first and second ends for engagement with a humped shoulder attached at the feed chute of the heating chamber to automatically lift the barrier upright blocking the access opening after the container is received in the cooling chamber.

9. The combination as recited in claim 1, wherein the cooling chamber includes a top wall, a bottom wall, first and second side walls and a curved rear wall integral with the first end of the handle opposite the access opening.

10. The combination as recited in claim 9, wherein the barrier of the latch assembly is pivotally attached to the bottom wall of the cooling chamber and spans the access opening with the barrier operative for lifting upright off the bottom wall blocking the access opening, wherein the length of the barrier includes a first end and a second end with a protrusion coupled to at least one end of the first and second ends for engagement with a humped shoulder attached at the feed chute of the heating chamber to automatically lift the barrier upright blocking the access opening after the container is received in the cooling chamber.

11. A toy oven and a spatula device for manipulating a container used in combination with the toy oven, comprising:
    a toy oven having a housing containing a heating chamber with an attached feed chute defining an access opening to the heating chamber; and
    a spatula device including a handle having a chamber coupled to a first end, including an access opening defined in a wall of the chamber and operating as a cooling chamber for a received container, further including a barrier coupled to the cooling chamber operative to automatically retain the container in the cooling chamber when received.

12. The combination as recited in claim 11, further including at least one shoulder coupled to a wall of the feed chute for engagement with at least one protrusion coupled to the barrier to automatically move the barrier to block the access opening of the cooling chamber retaining a received container when the cooling chamber end of the spatula device is removed from the feed chute of the toy oven.

13. The combination as recited in claim 11, wherein the cooling chamber comprises a temperature resistant plastic material.

14. The combination as recited in claim 11, wherein the cooling chamber comprises a thermochromic material capable of changing color corresponding to the temperature of the cooling chamber.

15. The combination as recited in claim 11, comprising a curved pusher end coupled at an end of said handle.

16. The combination as recited in claim 11, wherein the cooling chamber includes a top wall, a bottom wall, and first and second side walls and wherein the barrier is pivotally coupled with the bottom wall of the cooling chamber and spans the access opening with the barrier operative for lifting upright off the bottom wall blocking the access opening.

17. The combination as recited in claim 16, wherein the length of the barrier includes a first end and a second end with a protrusion coupled to at least one end of the first and second ends for engagement with a humped shoulder attached at the feed chute of the heating chamber to automatically lift the barrier upright blocking the access opening after the container is received in the cooling chamber.

18. A toy oven and a spatula device for manipulating a container used in combination with the toy oven, comprising:
- a toy oven having a housing containing a heating chamber with an attached feed chute defining an access opening to the heating chamber; and
- a spatula device including a handle having a chamber coupled to a first end, including an access opening defined in a wall of the chamber and operating as a cooling chamber for a received container, further including a latch assembly coupled to the cooling chamber including a barrier operative to retain the container in the cooling chamber when received.

19. The combination as recited in claim 18, further comprising an actuating bar operative with the latch assembly and the barrier to automatically retain the container in the cooling chamber when received and also manually release the container from the cooling chamber when the actuating bar is manipulated by a user.

20. The combination as recited in claim 19, wherein the cooling chamber includes a top wall, a bottom wall, and first and second side walls with the actuating bar coupled at the top wall of the cooling chamber.

* * * * *